UNITED STATES PATENT OFFICE.

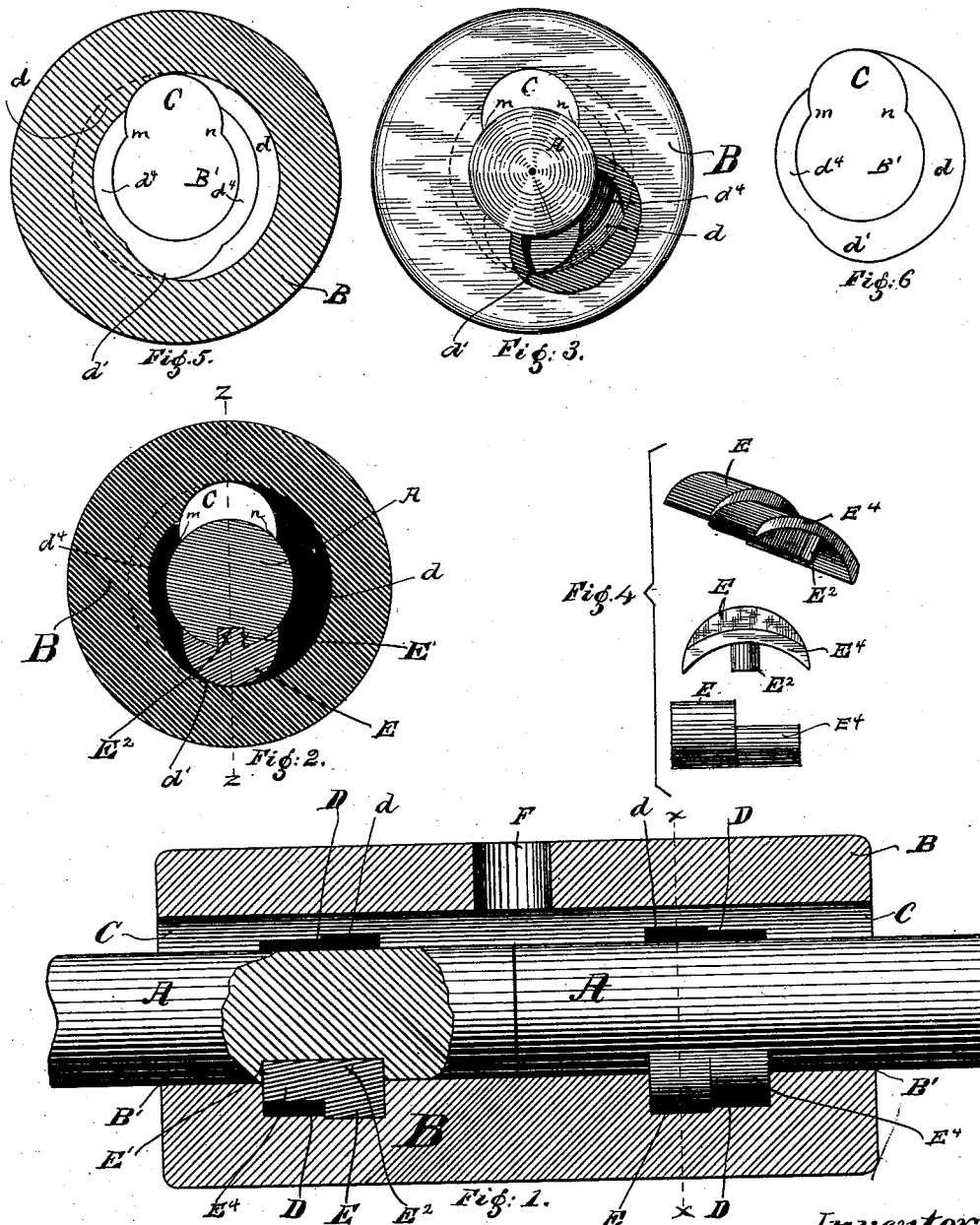

JEFFERY THOMAS FERRES, OF ANDERSON, INDIANA.

COUPLING FOR SHAFTS.

SPECIFICATION forming part of Letters Patent No. 469,780, dated March 1, 1892.

Application filed June 15, 1891. Serial No. 396,371. (No model.)

*To all whom it may concern:*

Be it known that I, JEFFERY THOMAS FERRES, a citizen of Canada, residing at Anderson, in the county of Madison and State of Indiana, have invented certain new and useful Improvements in Couplings for Shafts, &c.; and I do hereby declare the following to be a full, clear, and exact description of the invention, such as will enable others skilled in the art to which it appertains to make and use the same.

This invention relates to improvements in friction-couplings for securing pulleys to shafts and for coupling together the meeting ends of sections of line-shafting.

The object of this invention is to make a coupling which shall be simple in construction, easy of application, and when used in coupling shafting will preserve the alignment of the two sections more accurately than has heretofore been accomplished in couplings of this class.

The invention consists, primarily, in a coupling-piece preferably cylindrical and having a concentric bore of a diameter slightly greater than the diameter of the shaft on which it is to be used and having a crescent-shaped longitudinal groove integral with the bore and extending the entire length of the coupling-sleeve.

The invention further consists in one or more double cam-shaped enlargements or chambers and in a key or wedge to operate in said chambers so as to lock the shaft; and the invention consists in certain novel constructions and combinations of parts, substantially as hereinafter described, and pointed out in the claims.

In the accompanying drawings, Figure 1 represents a longitudinal section of my invention applied to sections of line-shafting, parts of which only are shown; Fig. 2, a transverse section of same, taken on the line $x\ x$ in Fig. 1. Fig. 3 is an end view of coupling-sleeve and shaft and shows the coupling-sleeve broken away to illustrate the inside construction; Fig. 4, details in perspective view and end and side elevations, respectively, of the wedge; Fig. 5, a transverse section through the coupling-sleeve, the shaft and wedge being removed; and Fig. 6, a diagram illustrating the shape of the cam-shaped chamber.

Referring to the drawings, A represents the meeting ends of two sections of line-shafting.

B is the coupling-sleeve, or if a pulley is to be fastened to the shaft B will represent the hub. The concentric bore B' is shown as occupied by the shaft $a$.

C is the longitudinal groove in the coupling-sleeve, communicating throughout its length with the bore B'.

D are the double cam-shaped chambers, and E the key or wedge.

Near the end of each of the shaft-sections, but sufficiently remote therefrom to preserve the proper strength of the remaining material, is a key-seat E' of a size and shape conforming to that of the gib $E^2$, formed on the wedge E, and is adapted to form a seat for said gib.

By means of the gib $E^2$ and its seat E' the wedge will be secured to the shaft and will turn with it and by contacting with the sides of the cam-shaped chamber in the coupling-sleeve when the latter is placed in position over the wedge will lock the shaft and coupling-sleeve together and effectually prevent longitudinal displacement. When the two sections of shafting are thus locked to the coupling-sleeve, the latter will form a connection between the two sections and join them together.

The longitudinal groove C is to allow the wedges to be placed in position in the ends of the shafting before the coupling-sleeve is in position and then slide the coupling-sleeve over them into place. It may be of any convenient shape in cross-section that will serve the purpose for which it is designed; but a crescent shape, as shown in the drawings, is thought to be preferable. This groove is a very important feature of my invention. It allows the keys to be placed in position on the shaft and then introduced into the coupling from the end, as above described, making the application much easier than in couplings as heretofore constructed. The metal removed from the sleeve to form the groove leaves the shaft unsupported by the sides of the bore opposite the point where the wedge tightens, and the angles $m\ n$ thus formed will make positive bearings and in connection with the bearing-point of the wedge will always insure three points of contact between the coupling-sleeve and the shaft. By this construction the rocking and twisting of the shaft inside the coupling-sleeve, so common and disastrous in couplings of this class having a continuous bore and consequently only two bearing-points, are prevented. The chambers D are passages extending around the inside of the bore and communicating at each end with the groove C.

The part $d$, Fig. 6, is equal in depth to the greatest thickness of the wedge, and the curvature of the outer wall is concentric with the bore of the coupling-sleeve up to the point $d'$, which is approximately opposite the center of the groove C. At this point the depth of the chamber is lessened gradually until it is about one-half of its original depth, and is thence continued in a curve concentric with the bore until it merges into the groove C. The chamber is thus cam-shaped at $d'$ in order to tightly impinge the wedge when it is opposite the groove C. The wedge will be forced into this locking position by turning the shaft so as to force the wedge first through the enlarged part $d$ of the chamber and thence into contact with the part $d'$. As a chamber as above described would lock the shaft when the latter was revolving in a certain direction and would unlock when the direction of revolution was reversed, I have found it necessary to use a double cam-shaped chamber having right and left handed compartments. This makes it necessary to reverse the wedge, so as to bring the enlarged portion around into the proper chamber, and is easily done by slipping the coupling back and turning the wedges around. The contracted part $E^4$ of the wedge gives additional strength but does not assist materially in locking the shaft. The continuation $d^4$ of the chamber is to allow the free passage of the part $E^4$ of the wedge. The concave surface of the wedge E corresponds in curvature with the shaft to which it is applied. The hole F, midway between the ends of the coupling and extending through the walls, enables the operator to see when the shafts have been inserted the proper distance into the coupling.

The application of my improved device is as follows: The coupling-sleeve is first slipped onto one of the ends of shafting to be joined. The ends of the two sections are then brought together with their key-seats uppermost. Then, if the shaft is to revolve from right to left, place both keys in position with their thickest parts out or away from the center of the coupling-sleeve; but if the shaft is to turn in the opposite direction—that is, from left to right—place both keys with their thickest parts toward the center of the coupling-sleeve. Having placed the keys properly, slide the coupling-sleeve over them until the ends of the shafts can be seen through the hole F. Then revolve the shaft in the direction in which it is to run, and the keys will be carried around and be tightened at $d'$ opposite the groove where they were inserted. To remove the coupling-sleeve, turn the shaft in the opposite direction from that in which it runs and slide the coupling-sleeve off.

When used as a pulley-hub, only one of the double cam-shaped chambers can be used, or, in case of a large pulley two sets of chambers made to tighten in the same direction.

I claim—

1. A coupling-sleeve made of one piece of metal, with a concentric bore having a longitudinal groove on one side of said bore, the sides and top of the groove being parallel with the bore and communicating therewith throughout its entire length, cam-shaped chambers extending around the bore, and wedges shaped and arranged substantially as described.

2. A coupling-sleeve having a concentric bore to receive the shaft, a longitudinal groove parallel with and communicating with the bore, and double cam-shaped chambers extending around the bore and communicating therewith, in combination with wedges of the form shown and adapted to be impinged between the shafts and coupling-sleeve and so arranged as to tighten at the same point when the shaft is turned in either direction and to be in line with each other when in tightened position, substantially as described.

3. A coupling-sleeve having a concentric bore and double cam-shaped chambers extending around the bore and having a groove running the entire length of the sleeve and parallel with and communicating with the bore, in combination with wedges adapted to operate in said chambers and to be introduced therein through the groove, and shafts adapted to be inserted into the concentric bore and to be engaged by the wedges, substantially as described.

4. A coupling-sleeve having a concentric bore, a longitudinal groove on one side of the bore, double cam-shaped chambers extending around the bore and communicating therewith, and an opening through one side of the sleeve at a point midway between the ends, in combination with wedges adapted to be inserted through the groove into the chambers, and a shaft, substantially as described.

In testimony whereof I have affixed my signature in presence of two witnesses.

JEFFERY THOMAS FERRES.

Witnesses:
LEANDER M. SCHWINN,
WILLIAM A. KITTINGER.